United States Patent [19]

Belanger

[11] 4,137,140

[45] Jan. 30, 1979

[54] CATHODIC ELECTROCOATING

[75] Inventor: William J. Belanger, Louisville, Ky.

[73] Assignee: Celanese Polymer Specialties Company, Louisville, Ky.

[21] Appl. No.: 871,296

[22] Filed: Jan. 23, 1978

Related U.S. Application Data

[62] Division of Ser. No. 715,266, Aug. 18, 1976, abandoned.

[51] Int. Cl.$^2$ ............................................. C25D 13/00
[52] U.S. Cl. .................................................. 204/181 C
[58] Field of Search ..................................... 204/181 C

[56] References Cited

U.S. PATENT DOCUMENTS

| 2,909,448 | 10/1959 | Schroeder | ............................. 117/141 |
| 3,640,926 | 2/1972 | Slater et al. | ....................... 204/181 C |

*Primary Examiner*—Howard S. Williams
*Attorney, Agent, or Firm*—Herbert P. Price; K. A. Genoni; T. J. Morgan

[57] ABSTRACT

Polyepoxide resins are adducted with polyamines which are further reacted with a monoepoxide or a monocarboxylic acid. When salted with an acid, the resinous adducts are water soluble or water dispersible. The resin solutions or dispersions are particularly useful in cathodic electrodeposition processes for prime coating metal objects.

8 Claims, No Drawings

CATHODIC ELECTROCOATING

CROSS REFERENCE TO RELATED APPLICATIONS

This is a division of application, Ser. No. 715,266, filed Aug. 18, 1976, now abandoned.

BACKGROUND OF THE INVENTION

The field of art to which this invention pertains is synthetic resins containing a hydrophilic group, said resins being soluble or dispersible in water when salted and being cathodically electrodepositable.

The coating of electrically conductive substrates by electrodeposition is an important industrial process. In this process, a conductive article is immersed as one electrode in a coating composition made from an aqueous dispersion of filmforming polymer. An electric current is passed between the article and a counter-electrode in electrical contact with the aqueous dispersion, until a desired coating is produced on the article. At the present time, the article to be coated is usually made the anode in the electrical circuit with the counter-electrode being the cathode.

For some purposes, there are disadvantages in the use of anodic deposition methods. For example, anodic deposition on ferrous metals tends to discolor the electrodeposited film, and phosphate conversion coatings, which are commonly applied to a metal surface before an organic coating composition is deposited thereon, tend to be stripped from the metal under anodic deposition conditions. In addition, it is a peculiarity of anodic electrophoretic coating methods that nascent oxygen is produced at the anode, which can react with the resinous polymers to produce bubbles or voids in the deposited coatings. Such coatings are often lacking in resistive properties.

Recently, extended efforts have been put forth to develop cathodic electrodepositable compositions to alleviate the discoloration problems and to improve resistance properties. Although nascent hydrogen develops at the cathode during the cathodic electrophoretic coating process, no metal ions pass into the coating solution or are present in the deposited film. Generally, the amount of nascent hydrogen produced at the cathode does not have the same deleterious effect on the properties of the deposited film as does the nascent oxygen produced during anodic deposition.

Cathodic coating compositions generally are derived from resinous compositions containing a basic nitrogen atom which can be salted with an acid and then be dissolved or dispersed in water. Cathodic coating compositions are described in U.S. Pat. No. 3,729,435 wherein the reaction product of any epoxy resin and a secondary amine are further reacted with a monocarboxylic fatty acid and a polymer containing at least two carboxylic acid groups. The resulting product is then reacted by heating with an amino resin or a phenolic resin. The resinous reaction product is salted with an acid and dissolved or dispersed in water to form a cathodic electrodeposition bath.

U.S. Pat. No. 3,719,626 describes curable cathodically electrodepositable coating compositions made from aqueous solutions of a carboxylic acid salt of an adduct of a polyepoxide resin and allyl or diallyl amine.

In U.S. Pat. No. 3,804,786, water dispersible cationic resins are made by reacting an hydroxy containing polyepoxide resin with a polyisocyanate in an amount insufficient to cross-link and gel the resin. A portion of the epoxide groups are reacted with an unsaturated fatty acid and the remaining epoxide groups are reacted with a monosecondary amine. The result product is then salted with a carboxylic acid and dispersed in water to form a cathodic electrodeposition bath.

Netherlands patent application No. 7,407,366 describes cathodic deposition baths made from an aqueous dispersion of a carboxylic acid salt of the reaction product of a diepoxide resin with polyfunctional amines and monofunctional amines, the polyfunctional amines acting as coupling agents and the monofunctional amines acting as terminating agents.

In U.S. Pat. No. 3,947,339, cationic electrodepositable resins having improved throwing power and dispersibility are made from amine group-solubilized, epoxy resin-derived resins which contain primary amine grops. These primary amine groups are incorporated into the electrodepositable resin by reacting the epoxy-group containing resin with polyamines in which the primary amine groups are blocked by ketimine groups.

Additional cathodic electrodeposition resins are described in U.S. Pat. Nos. 3,617,458, 3,619,398, 3,682,814, 3,891,527 and 3,947,338.

U.S. Pat. Nos. 2,772,248 and 3,336,253 describe water soluble resinous compositions made from acid salts of adducts of polyepoxides and polyamines. U.S. Pat. No. 2,909,448 is directed to epoxy resin curing agents made from acid salts of polyepoxide polyamine adducts.

SUMMARY OF THE INVENTION

This invention pertains to aqueous resinous coating compositions. In particular this invention relates to cathodically electrodepositable aqueous resinous coating compositions and to cathodic electrodeposition processes.

By this invention an aqueous coating composition is made from an ionizable salt of an acid and the reaction product of a polyepoxide resin, a polyamine and a monoepoxide or monocarboxylic acid. The polyepoxide resin is derived from a dihydric phenol and an epihalohydrin and has a 1,2-epoxide equivalent weight of about 400 to about 4000. The polyamine contains at least 2 amine nitrogen atoms per molecule, at least 3 amine hydrogen atoms per molecule and at least 2 carbon atoms per molecule. The monoepoxide contains one 1,2-epoxide group per molecule, no other groups reactive with amine groups, and has about 8 to about 24 carbon atoms per molecule. The monocarboxylic acid contains one carboxylic acid group and no other groups reactive with amine groups and contains about 8 to about 24 carbon atoms. In the composition, about 1 mol of the polyamine is reacted with each epoxide group of the polyepoxide resin and about 2 to about 6 mols of monoepoxide or monocarboxylic acid are reacted for each mol of polyepoxide resin originally present. The weight per active nitrogen of the reaction product is about 200 to about 600.

The coating compositions of this invention can be used in cathodic electrodeposition processes to coat metal articles with primer coatings having excellent corrosion resistance.

DESCRIPTION OF THE INVENTION

The compositions of this invention are the reaction products of polyepoxide resins adducted with a polyamine and further reacted with a monoepoxide or a monocarboxylic acid. These compositions can be described by the formula $$D_x - B - A - B - D_x$$

wherein

A represents a reacted polyepoxide resin,
B represents a reacted polyamine,
D represents a reacted monoepoxide or monocarboxylic acid, and
x represents an integer of 1 to 3.

In the above formula, the A—B linkage, which is formed by the reaction of an epoxide group with an amine group, can be represented by the skeletal formula

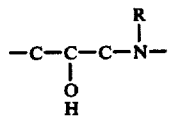

(I)

wherein R is an alkylene amine group or hydrogen.

The B—D linkage when it is formed by the reaction of the adducted amine and a monoepoxide can also be described by the skeletal formula (I). However, when the adducted amine is reacted with a monocarboxylic acid, an amide is formed

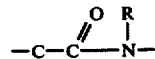

(II)

wherein R is hydrogen or an alkylene amine group.

The nitrogen atom as shown in (I) is a secondary or tertiary amine nitrogen and for the purposes of this invention is defined as an active nitrogen. The nitrogen atom as shown in (II) is an amide nitrogen and for the purposes of this invention is an inactive nitrogen. The compositions of this invention have a weight per active nitrogen within the range of 200 to 600 and preferably 300 to 400.

The polyepoxide resins useful in this invention are glycidyl polyethers of polyhydric phenols and contain more than one up to two 1,2-epoxide groups per molecule. Such polyepoxide resins are derived from an epihalohydrin and a dihydric phenol and have an epoxide equivalent weight of about 400 to about 4000. Examples of epihalohydrins are epichlorohydrin, epibromohydrin and epiiodohydrin with epichlorohydrin being preferred. Dihydric phenols are exemplified by resorcinol, hydroquinone, p,p'-dihydroxydiphenylpropane (or Bisphenol A as it is commonly called), p,p'-dihydroxybenzophenone, p,p'-dihydroxydiphenyl, p,p'-dihydroxydiphenyl ethane, bis(2-hydroxynaphthyl)methane, 1,5-dihydroxynaphthylene and the like with Bisphenol A being preferred. These polyepoxide resin are well known in the art and are made in desired molecular weights by reacting the epihalohydrin and the dihydric phenol in various ratios or by reacting a dihydric phenol with a lower molecular weight polyepoxide resin. Particularly preferred polyepoxide resins are glycidyl polyethers of Bisphenol A having epoxide equivalent weights of about 450 to about 2,000.

The polyamines which are reacted with the polyepoxide resins in this invention contain at least 2 amine nitrogen atoms per molecule, at least 3 amine hydrogen atoms per molecule and no other groups which are reactive with epoxide groups. These polyamines can be aliphatic, cycloaliphatic or aromatic and contain at least 2 carbon atoms per molecule. Useful polyamines contain about 2 to about 6 amine nitrogen atoms per molecule, 3 to about 8 amine hydrogen atoms and 2 to about 20 carbon atoms. Examples of such amines are the alkylene polyamines, ethylene diamine, 1,2-propylene diamine, 1,3-propylene diamine, 1,2-butylene diamine, 1,3-butylene diamine, 1,4-butylene diamine, 1,5-pentalene diamine, 1,6-hexylene diamine, o, m and p-phenylene diamine, 4,4'-methylene dianiline, menthane diamine, 1,4-diaminocyclohexane, methyl-amino-propylamine, and the like. Preferred amines for use in this invention are alkylene polyamines of the formula

wherein n is an integer of 0 to 4 and R is an alkylene group containing 2 to 4 carbon atoms. Examples of such alkylene polyamines are ethylene diamine, diethylene triamine, triethylene tetramine, tetraethylene pentamine, pentaethylene hexamine, dipropylene triamine, tributylene tetramine and the like. Mixtures of amines can also be used. The more preferred amines are the ethylene polyamines with the most preferred being triethylene tetramine and tetraethylene pentamine.

The monoepoxides and monocarboxylic acids which are used in this invention to modify the polyepoxide-polyamine adducts are those compounds which contain either one 1,2-epoxide group per molecule or one carboxylic acid group and no other groups which are reactive with amine groups and which contain from about 8 to about 24 carbon atoms per molecules. Examples of monoepoxides are epoxidized hydrocarbons, epoxidized unsaturated fatty esters, monoglycidyl ethers of aliphatic alcohols and monoglycidyl esters of monocarboxylic acids. Examples of such monoepoxides are: epoxidized unsaturated hydrocarbons which contain 8 to 24 carbon atoms, e.g., octylene oxide, decylene oxide, dodecylene oxide and nonadecylene oxide; epoxidized monoalcohol esters of unsaturated fatty acids wherein the fatty acids contain about 8 to about 18 carbon atoms and the alcohol contains 1 to 6 carbon atoms, e.g., epoxidized methyl oleate, epoxidized n-butyl oleate, epoxidized methyl palmitoleate, epoxidized ethyl linoleate and the like; monoglycidyl ethers of monohydric alcohols which contain 8 to 20 carbon atoms, e.g., octyl glycidyl ether, decyl glycidyl ether, dodecyl glycidyl ether, tetradecyl glycidyl ether, hexadecyl glycidyl ether and octadecyl glycidyl ether; monoglycidyl esters of monocarboxylic acids which contain 8 to 20 carbon atoms, e.g., the glycidyl ester of caprylic acid, the glycidyl ester of capric acid, the glycidyl ester of lauric acid, the glycidyl ester of stearic acid, the glycidyl ester of arachidic acid and the glycidyl esters of alpha, alpha-dialkyl monocarboxylic acids described in U.S. Pat. No. 3,178,454 which is hereby incorporated by reference. Examples of such glycidyl esters are those derived from about 9 to about 19 carbon atoms, particularly Versatic 911 Acid, a product of Shell Oil Company, which acid contains 9 to 11 carbon atoms.

Monocarboxylic acids which can be used in this invention contain about 8 to about 24 carbon atoms and can be saturated or unsaturated. Examples of such acids are caprylic acid, capric acid, stearic acid, behenic acid, oleic acid, linoleic acid, linolenic acid and liconic acid. Such acids can be those derived from naturally occurring oils and which are named from the oil from which it is derived, e.g., linseed fatty acids, soya fatty acids, cottonseed fatty acids, cocoanut fatty acids and the like.

The preferred monofunctional compounds used in this invention are monoglycidyl ethers of monohydric alcohols and monoglycidyl esters of monocarboxylic acids, with the most preferred being monoglycidyl ethers of 8 to 20 carbon monohydric alcohols.

In preparing the compositions of this invention, the polyepoxide resin and the polyamine are reacted under such conditions that the adduct so formed contains about 1 mol of adduct polyamine molecule for each epoxide equivalent originally present in the polyepoxide resin. This polyamine-polyepoxide resin adducting reaction is carried out using about 1 to about 10 mols of polyamine for each epoxide equivalent of the polyepoxide resin. When the reaction is completed, i.e., when all the epoxide groups have reacted, any excess unreacted polyamine is removed.

Aqueous solutions and dispersions of the polyamine-polyepoxide resin adduct can be formed from acid salts of the adduct. These solutions or dispersions can be used in coating processes, e.g., in electrodeposition processes. However, the coatings so formed are extremely hard and do not exhibit good primer properties. When electrocoated, the coatings do not develop good insulation properties. By this invention, the polyamine-polyepoxide resin adducts are modified with a long chain monoepoxide or monocarboxylic acid. The monoepoxide is reacted with primary or secondary amine groups of the adduct forming secondary or tertiary amines. The monocarboxylic acid also reacts with primary or secondary amine groups but amide groups are formed and water is split out. In modifying the adducts, about 2 about 6 mols of monoepoxide or monocarboxylic acid are reacted per each mol of polyepoxide resin in the adduct. Preferably about 2 to about 4 mols of monoepoxide resin are reacted with one mol of the adduct. When the monocarboxylic acid is used, about 2 mols are preferably reacted per mol of adduct. The amount of monoepoxide or monocarboxylic acid used will be that amount which will produce a modified adduct having weight per active nitrogen content of about 200 to about 600 and preferably about 300 to about 400.

In preparing the compositions of this invention, the polyamine and the polyepoxide resin are reacted at a temperature of about 75° F. to about 500° F. for a time sufficient to react all of the epoxide groups, generally about 5 minutes to about 3 hours. In order to prevent gelation during the reaction, the polyepoxide resin can be added to the polyamine at the reaction temperature. When the adducting reaction is completed, unreacted amine, if any, is removed by distillation, preferably under vacuum, up to a pot temperature of about 600° F.

The monoepoxide is reacted with the adduct at a temperature of about 150° F. to about 500° F. for a time sufficient to complete the epoxide-amine reaction, about 5 minutes to 3 hours. When a monocarboxylic acid is used to modify the adduct, the monocarboxylic and the adduct are reacted at a temperature of about 300° F. to about 500° F. with removal of water until the acid value is reduced below 5-10.

Aqueous compositions made from the modified adducts are highly useful as coating compositions, particularly suited to application by electrodeposition, although they may be applied by conventional coating techniques. It is necessary to add a neutralizing agent to obtain a suitable aqueous composition. Neutralization is accomplished by the salting of all or part of the amine groups by a water soluble organic or inorganic acid, e.g., formic acid, acetic acid, phosphoric acid, sulfuric acid, hydrochloric acid, and the like. A preferred acid is formic acid. The extent of neutralization depends upon the particular resin and it is only necessary that sufficient acid be added to solubilize or disperse the resin.

Electrocoating baths made from the modified adducts and acid can have pH of about 3 to about 10, but preferably will be about 5.5 to 7.5 and most preferably about 6 to about 7. The amount of acid will vary from about 0.2 to about 1 equivalent for each active nitrogen equivalent of the modified adduct, but preferably about 0.25 to about 0.7 equivalent and most preferably about 0.3 to 0.4 equivalent formic acid. If the pH is too low, corrosion of equipment is a problem. The electrocoating bath has high conductivity which causes the utilization of more current. More gassing occurs at the cathode causing rough coatings. The coatings have a lower rupture voltage and the throwing power (the ability to coat protected areas) is decreased. If the pH is high, the resin is difficult to dissolve or disperse and the resulting solution or dispersion is unstable. A pH close to neutral is preferred in order to obtain the best balance of coating properties and bath stability.

The electrocoating bath will generally contain in addition to the aqueous dispersion or solution of salted resin, an aminoplast or phenolplast resin. Suitable aminoplast resins are the reaction products of ureas and melamines with aldehydes further etherfield in some cases with an alcohol. Examples of aminoplast resin components are urea, ethylene urea, thiourea, melamine, benzoguanamine and acetoguanamine. Aldehydes useful in this invention are formaldehyde, acetaldehyde and propionaldehyde. The aminoplast resins can be used in the alkylol form but, preferably, are utilized in the ether form wherein the etherifying agent is a monohydric alcohol containing from 1 to about 8 carbon atoms. Examples of suitable aminoplast resins are methylol urea, dimethoxymethylol urea, butylated polymeric urea-formaldehyde resins, hexamethoxymethyl melamine, methylated polymeric melamine-formaldehyde resins and butylated polymeric melamine-formaldehyde resins. Aminoplast resins and their methods of preparation are described in detail in "Encyclopedia of Polymer Science and Technology", Volume 2, pages 1-91, Interscience Publishers (1965), which is hereby incorporated by reference.

Phenoplast resins are the reaction products of phenols and aldehydes which contain reactive methylol groups. These compositions can be monomeric or polymeric in nature depending on the molar ratio of phenol to aldehyde used in the initial condensation reaction. Examples of phenols which can be used to make the phenoplast resins are phenol, o, m, or p- cresol, 2,4-xylenol, 3,4-xylenol, 2,5-xylenol, cardanol, p-tert-butyl-phenol, and the like. Aldehydes useful in this reaction are formaldehyde, acetaldehyde and propionaldehyde. Particularly useful phenoplast resins are polymethylol phenols wherein the phenolic group is etherified with an alkyl, e.g., methyl or ethyl, group. Phenoplast resins and their methods of preparation are described in detail in "Encyclopedia of Polymer Science and Technology", Volume 10, pages 1-68, Interscience Publishers (1969), which is hereby incorporated by reference.

The amount of aminoplast or phenolplast resin used in this invention is about 8 weight percent to about 30 weight percent of the total vehicle solids weight and preferably about 15 to about 20 weight percent.

The aqueous coating compositions can also contain pigments, coupling solvents, anti-oxidants, surface-active agents and the like. The pigments are of the conventional type and are one or more of such pigments as iron oxides, lead oxides, strontium chromate, carbon black, titanium dioxide, talc, barium sulfate, barium yellow, cadmium red, chromic green, lead silicate and the like. The amount of pigment used will vary from no pigment up to a pigment/binder ratio by weight of 1/4, and preferably a pigment/binder ratio of about 1/6.

Coupling solvents are water soluble or partially water soluble organic solvents for the resinous vehicles used in this invention. Examples of such solvents are ethylene glycol monomethyl ether, ethylene glycol monoethyl ether, ethylene glycol monobutyl ether, diethylene glycol monobutyl ether, ethanol, isopropanol, n-butanol, and the like. These coupling solvents are used in the amounts of 0 up to about 5 weight percent of the total weight of the coating bath. The total bath solids are kept within the range, based on the total bath weight, of about 5 to about 20 weight percent and preferably, about 12 to about 18 weight percent.

In utilizing this invention, the electrocoating bath is prepared in an insulated container with an anode submersed in the bath and the object to be coated as the cathode. A direct electric current is applied using a voltage of 200 to 300 volts for a time sufficient to obtain a coating of about 0.5 to 1 mil, i.e., about 1 to 5 minutes. The coated object is then removed from the bath, rinsed and baked at 300 to 450° F. for 10 to 30 minutes to obtain a cured coating.

The following examples will describe the invention in more detail. Parts and percentages where used unless otherwise designated are parts and percentages by weight.

EXAMPLE 1

To a suitable reactor equipped with a stirrer, thermometer, inlet tube and condenser were added 2131 parts of triethylene tetramine. Stirring was begun and heat was applied raising the temperature to 160° F. While controlling the temperature at 160° F., 1368 parts of pulverized epoxide resin (the reaction product of epichlorohydrin and bisphenol A having an epoxide equivalent weight of 940 and a melting point of 100° C.) were added over a period of 1 hour and 15 minutes. After continued heating at 160° F. for one hour and 15 minutes, the flask was fitted with a downward condenser, and vacuum was applied to distill the unreacted excess amine. The temperature was slowly raised to 500° F. over a 2 hour and 15 minute period and was then lowered to 360° F., at which point vacuum was released. Ethylene glycol monobutyl ether, 1400 parts, was then added with the temperature dropping to 300° F. When solution was obtained, the temperature was lowered to 180° F. and 519 parts of a glycidyl ether of mixed fatty alcohols containing predominantly n-octyl and n-decyl groups, said glycidyl ether having an epoxide equivalent weight of 229 and a melting point of −22° C., were added over a period of one hour and 5 minutes while holding the temperature at 180° F. Heating at 180° F. was continued for one hour to complete the reaction. The resulting solution at 59% solids had a Gardner-Holdt viscosity at 25° C. of $Z_4$ and a Gardner color of 9–10.

To a suitable reactor were added 400 parts of the above resin solution. Vacuum was applied and the reactor contents were heated to 400° F. over a period of 2 hours and 35 minutes to distill off the solvents. After all the solvents were removed, the resin temperature was reduced to 250° F. Formic acid (88% in water), 6.93 parts, was added slowly along with 276 parts of deionized water.

While holding the temperature at about 200° F., additional water, 277 parts, was added until a homogeneous opaque dispersion was obtained. This dispersion had a solids content of 30.08%, a Gardner-Holdt viscosity at 25° C. of A, and pH of 7.7.

EXAMPLE 2

To a suitable reactor equipped as described in Example 1 were added 1881.7 parts of triethylene tetramine. Heat and agitation were applied and at 220° F., 1941.8 parts of an epoxide resin solution at 59.4% solids in ethylene glycol monomethyl ether (the epoxide resin was a glycidyl polyether of Bisphenol A having an epoxide equivalent weight of 895) were slowly added. The epoxide resin addition was completed in 1 hour and 5 minutes with the temperature dropping to 210° F. The temperature was slowly raised to 250° F. over 45 minutes and was held at 250–260° F. for 1 hour to complete the adducting reaction. The excess unreacted amine and the solvent were removed by heating the adduct solution to 450° F. under vacuum (25 mm Hg. pressure). When the distillation was completed, vacuum was released and the temperature was reduced to 360° F. Ethylene glycol monomethyl ether, 700 parts, was added with the temperature dropping to 245° F. When solution was obtained, 458.3 parts of the glycidyl ether of mixed fatty alcohols described in Example 1 were added over one hour and 10 minutes with the temperature at 240–255° F. Heating was stopped after an additional hour at 240° F. The resulting product had a solids content of 71.3%, and a Gardner-Holdt viscosity of $Z_6$–$Z_7$.

EXAMPLE 3

To a mixing tank equipped with an agitator were added 21.62 parts of deionized water. Pigments, 4.0 parts of carbon black, 8.0 parts of black iron oxide, 8.0 parts of red iron oxide and 20.0 parts of lead silicate, were added with good agitation. The adduct solution described in Example 1, 16.67 parts, the adduct solution described in Example 2, 21.28 parts, and 0.43 part of formic acid (88% in water) were added with agitation. The resulting mixture was then ground in a sand grinder to form a smooth pigment paste.

EXAMPLE 4

Using the same procedure described in Example 2, 3044 parts of triethylene tetramine were reacted with 2792 parts of a solution at 70% solids in ethylene glycol monoethyl ether of the epoxide resin described in Example 1. When the reaction was completed, the excess unreacted triethylene tetramine was removed by distillation. The adduct, after being reduced with 100 parts of ethylene glycol monomethyl ether, was reacted with 741 parts of the glycidyl ether of mixed fatty alcohols described in Example 1. The resulting product had a solids content of 73.4%.

EXAMPLE 5

A resin preblend was prepared from 78.69 parts of the resin solution described in Example 4 and 21.31 parts of a butylated melamine formaldehyde resin at 75% solids in n-butanol. 50.50 parts of the resin preblend were added to an agitated tank containing 48.35 parts of deionized water and 1.15 parts of formic acid at 88% solids in water. Agitation was continued until a homogeneous solution/dispersion was obtained. 84.92 Parts of this solubilized resin were blended with 15.60 parts of the pigment grind described in Example 3. The resulting coating composition had a solids content of 39.8%, a weight per gallon of 9.2 lbs., contained 14.3% pigments based on 100% solids coating material and contained 51.6 milliequivalents of formic acid per 100 grams of solid coating material.

An electrocoating tank was filled with the above described coating composition diluted to 15% solids with deionized water. Bare steel, oily steel and zinc phosphated steel panels were made the cathode in a direct electric circuit and were immersed in the electrocoating bath. The panels were coated for 2 minutes using 250 volts. The coated panels were rinsed with water to remove carryout and were baked at 375° F. for 30 minutes. The resulting cured coatings had excellent impact resistance and corrosion resistance, exhibiting no scribe creepage or blisters after 340 hours in a salt spray tank. The throwing power was 11 to 12 inches with excellent corrosion protection over all the coated panels.

Under continuous operation, the coating composition in the tank was kept at substantially the same composition as the initial charge by using a two component feed. One feed was the pigment grind described in Example 3, the other feed was the resin preblend described in the first paragraph of this example.

EXAMPLE 6

A resin preblend was prepared from 80 parts of the resin solution described in Example 4 and 20 parts of a butylated melamine formaldehyde resin at 70% solids in n-butanol. 53.19 Parts of this blend were added to an agitated tank containing 45.66 parts of deionized water and 1.15 parts of formic acid (88% in water). This solubilized resin, 85.9 parts, was blended with 13.85 parts of the pigment paste described in Example 3 to form a coating composition having a solids content of 41.2%, a pigment content of 14.26%, based on 100% solids coating material, and the milliequivalents of formic acid per 100 grams of solids coating material being 53.3. When this coating composition was used in an electrocoating bath following the description of Example 5, comparable results were obtained.

EXAMPLE 7

To a suitable reactor equipped as described in Example 1 were added 1180 parts of triethylene tetramine and 892 parts of ethylene glycol monobutyl ether. The temperature was raised to 170° F. and 758 parts of pulverized epoxide resin described in Example 1 were added over 50 minutes while keeping the temperature at 170° F. After the addition of epoxide resin was completed, the temperature was held at 170° F. for one hour and 45 minutes. The temperature was then lowered to 150° F. and the reactor was fitted with a distillation condenser. The temperature was raised to 180° F. and water aspirator vacuum was applied. Heating was continued for 1 hour and 15 minutes to distill the solvent and excess triethylene tetramine while the temperature rose to 300° F. The temperature was held at 300° F. for 1 hour and 15 minutes. The temperature was then raised to 400° F. with no distillate coming over. The temperature was lowered to 250° F., vacuum was released and 892 parts of ethylene glycol monobutyl ether were added. The temperature was raised to 330° F. and was held at this temperature until solution was obtained. The temperature was reduced to 165° F. and 462 parts of a glycidyl ether of mixed fatty alcohols containing predominantly n-dodecyl and n-tetradecyl groups, said glycidyl ether having an epoxide equivalent weight of 286 and a melting point of 2° C., were added over a period of 50 minutes. Heating was continued for 40 minutes at 170° F. to complete the reaction. The resulting solution at 59.5% solids had a Garnder-Holdt viscosity at 25° C. of $Z_1$-$Z_2$ and a Gardner color of 10.

This resin solution was pigmented and solubilized using the procedure described in Examples 5 and 6. When used in an electrocoating bath following the description in Example 5, comparable results were obtained.

EXAMPLE 8

To a suitable reactor equipped as described in Example 1 were added 292 parts of triethylene tetramine and 751 parts of ethylene glycol monobutyl ether. The temperature was raised to 180° F., and 1393 parts of a solution (70% solids in ethylene glycol monobutyl ether) of a glycidyl polyether of Bisphenol A having an epoxide equivalent weight of 490 were added over a period of 1 hour and 15 minutes while holding the temperature at 175° F. Heating at 175° F. was continued for 1 hour and 5 minutes. 1460 Parts of a glycidyl ether of mixed fatty alcohols containing predominantly n-hexadecyl and n-octadecyl groups, said glycidyl ether having an epoxide equivalent weight of 348 and a melting point of 35.7%, were added over 35 minutes while holding the temperature at 170° F. Heating was continued at 165° F. to 170° F. for about 3 hours to complete the reaction. After the addition of 425 parts of ethylene glycol monobutyl ether, the resinous adduct had a solids content of 59.45%.

The resinous adduct solution was formulated into an electrocoating composition using the procedure described in Example 5. Steel panels were coated and cured using the procedure described in Example 5. Continuous well cured coatings were obtained. However, these coatings were somewhat inferior to those described in Example 5 in film smoothness, hardness and corrosion resistance.

EXAMPLE 9

Using the same procedure described in Example 8, 1699 parts of a glycidyl polyether of Bisphenol A having an epoxide equivalent weight of 945 were reacted with 265 parts of triethylene tetramine in 1286 parts of ethylene glycol monobutyl ether, followed by reaction with 1036 parts of a glycidyl ether of mixed fatty alcohols containing predominantly n-dodecyl and n-tetradecyl groups, said glycidyl ether having an epoxide equivalent weight of 286 and a melting point of 2° C. The resulting resinous adduct when reduced to 57.6% solids with ethylene glycol monobutyl ether had a Gardner-Holdt viscosity of $Z_6$—$Z_7$. The resinous solution was formulated into an electrocoating composition using the procedure described in Example 5. Steel panels were coated and cured using the procedure described in Example 5. Continuous well cured coatings were obtained which were somewhat inferior to those described in Example 5, particularly in film smoothness and corrosion resistance.

It is to be understood that the foregoing detailed description is given merely by way of illustration and that many variations may be made therein without departing from the spirit of the invention.

I claim:

1. A method of coating an electrically conductive substrate which comprises
    (I) passing an electric current between an anode an a cathode in contact with water dispersed composition in which the major resinous component is an ionizable salt of an acid and the ungelled reaction product of
        (A) a polyepoxide resin derived from a dihydric phenol and an epihalohydrin, said polyepoxide resin having a 1,2-epoxide equivalent weight of about 400 to about 4000 and
        (B) a polyamine having at least 2 amine nitrogen atoms per molecule, at least 3 amine hydrogen atoms per molecule and no other groups reactive with epoxide groups; followed by reaction with
        (C) a monoepoxide which contains one 1,2-epoxide groups and no other groups reactive with amine groups, or a monocarboxylic acid which contains one carboxylic acid group and no other groups reactive with amine groups, said monoepoxide and monocarboxylic acid having about 8 to 24 carbon atoms per molecule,
    wherein about 1 mol of (B) is reacted with each epoxide equivalent of (A), about 2 to about 6 mols of (C) are reacted per each mol of (A) and wherein said reaction product has a weight per active nitrogen of about 200 to about 600, and
    (II) depositing a coating on the cathode.

2. The process of claim 1 wherein the polyepoxide resin is derived from p,p'-dihydroxydiphenyl propane and epichlorohydrin and has a 1,2-epoxide equivalent weight of about 450 to about 2000.

3. The process of claim 1 wherein the polyamine is an alkylene polyamine having the formula

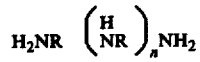

wherein n is an integer of 0 to 4 and R is an alkylene group containing 2 to 4 carbon atoms.

4. The process of claim 3 wherein the alkylene polyamine is an ethylene polyamine.

5. The process of claim 4 wherein the ethylene polyamine is triethylene tetramine.

6. The process of claim 1 wherein the monoepoxide is a glycidyl ether of a fatty alcohol wherein the fatty alcohol contains 8 to 20 carbon atoms.

7. The process of claim 1 wherein the acid is formic acid.

8. The process of claim 1 wherein the weight per active nitrogen is about 300 to about 400.